(12) United States Patent
Della Rossa et al.

(10) Patent No.: US 10,449,585 B2
(45) Date of Patent: Oct. 22, 2019

(54) DRAWING ASSEMBLY FOR DRAWING MACHINES, PROVIDED WITH INTERMEDIATE CHAINS, AND METHOD FOR TENSIONING SAID INTERMEDIATE CHAINS

(71) Applicant: DANIELI & C. OFFICINE MECCANICHE SPA, Buttrio (IT)

(72) Inventors: Flavio Della Rossa, Buttrio (IT); Fausto Menosso, Pradamano (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 579 days.

(21) Appl. No.: 15/037,956

(22) PCT Filed: Nov. 24, 2014

(86) PCT No.: PCT/IB2014/066286
§ 371 (c)(1),
(2) Date: May 19, 2016

(87) PCT Pub. No.: WO2015/075695
PCT Pub. Date: May 28, 2015

(65) Prior Publication Data
US 2016/0296987 A1    Oct. 13, 2016

(30) Foreign Application Priority Data

Nov. 22, 2013  (IT) .............................. UD2013A0156

(51) Int. Cl.
*B21C 1/30*   (2006.01)
*B65G 23/44*  (2006.01)

(52) U.S. Cl.
CPC ................ *B21C 1/30* (2013.01); *B65G 23/44* (2013.01)

(58) Field of Classification Search
CPC ............ B65G 15/60; B65G 23/44; B21C 1/30
(Continued)

(56) References Cited

U.S. PATENT DOCUMENTS 2,767,829 A    10/1956  Hallden
2,868,356 A *   1/1959  Haaff ...................... B65G 23/14
                                                        198/833

(Continued)

FOREIGN PATENT DOCUMENTS

EP    0548723    6/1993
FR    1082651   12/1954

OTHER PUBLICATIONS

International Search Report and Written Opinion, issued in the corresponding international PCT application No. PCT/IB2014/066286, dated Mar. 6, 2015, 7 pages.

*Primary Examiner* — William R Harp
(74) *Attorney, Agent, or Firm* — Hamre, Schumann, Mueller & Larson, P.C.

(57) ABSTRACT

A drawing assembly for drawing machines for metal products (B) comprises two tracks (11) opposite each other and counter-rotating that collaborate with said metal products (B) on opposite sides with respect to a drawing axis (X) to draw them along said drawing axis (X) The tracks (11) are disposed in a closed ring around respective support plates (13), and an intermediate chain (15) is interposed between the track (11) and the corresponding support plate (13). Each support plate (13) includes at least two guide segments (18; 118), lateral, having a convex shape externally mating with the curve of the intermediate chain (15). The drawing assembly (10) comprises, for each intermediate chain (15), an automatic tensioning device (21) provided with at least one thruster member (22) acting on a respective one of the guide segments (18; 118) in order to exert constantly upon (Continued)

it a distancing thrust, to keep it constantly in contact with the corresponding intermediate chain (15).

9 Claims, 3 Drawing Sheets

(58) Field of Classification Search
USPC .................. 198/626.1–626.5, 813, 814, 816
See application file for complete search history.

(56) References Cited

U.S. PATENT DOCUMENTS

| | | | | |
|---|---|---|---|---|
| 3,195,712 | A * | 7/1965 | Boschi | B66B 21/10 |
| | | | | 104/20 |
| 3,918,894 | A * | 11/1975 | Stanke | B65G 35/08 |
| | | | | 198/795 |
| 3,985,225 | A * | 10/1976 | Baum | B65G 39/10 |
| | | | | 198/834 |
| 4,261,459 | A * | 4/1981 | Latowski | B65G 35/08 |
| | | | | 198/795 |
| 4,780,040 | A * | 10/1988 | Petersen | B65G 23/44 |
| | | | | 198/817 |
| 5,326,010 | A * | 7/1994 | Moras | B21C 1/30 |
| | | | | 226/170 |
| 6,644,467 | B1 * | 11/2003 | Chiuch | B21C 1/30 |
| | | | | 198/626.1 |
| 6,663,523 | B1 * | 12/2003 | Chiuch | B21C 1/30 |
| | | | | 166/77.3 |
| 7,543,696 | B2 * | 6/2009 | Aulanko | B66B 23/20 |
| | | | | 198/329 |
| 8,910,774 | B2 * | 12/2014 | Hundegger | B23Q 7/03 |
| | | | | 198/626.5 |
| 9,636,728 | B2 * | 5/2017 | Menosso | B65H 51/14 |
| 9,849,491 | B2 * | 12/2017 | Della Rossa | B21C 1/30 |

* cited by examiner

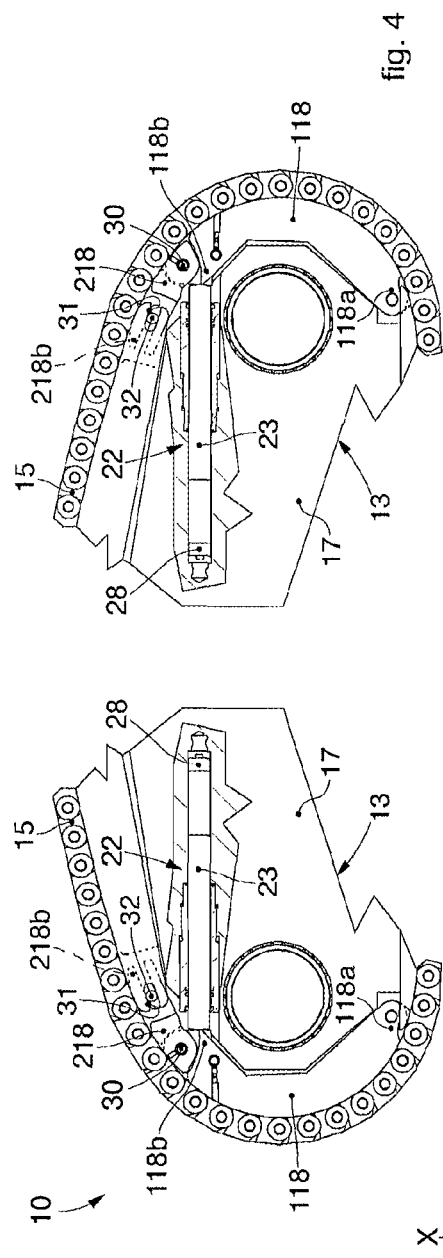
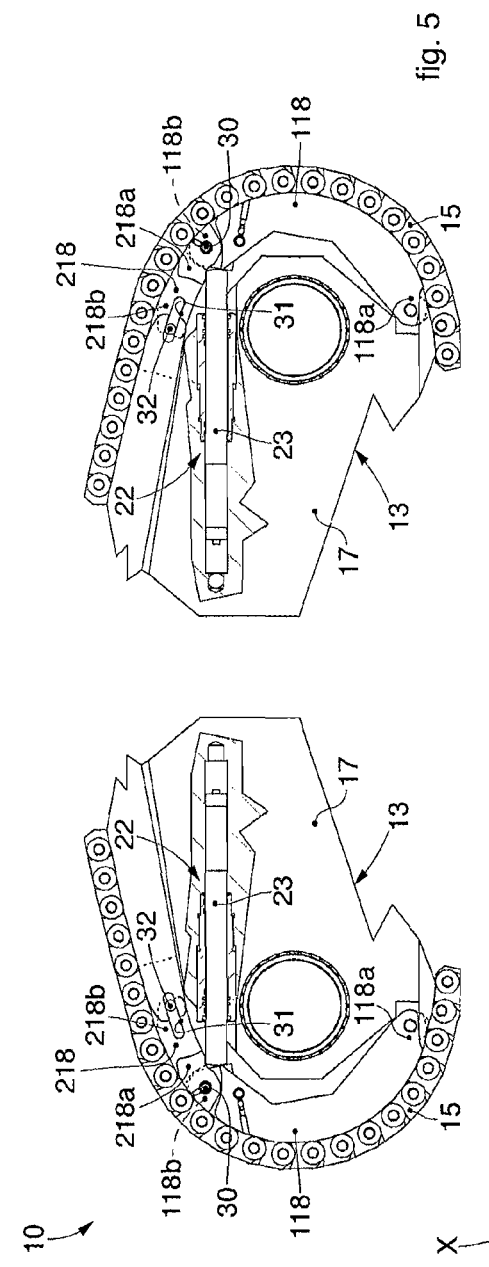

DRAWING ASSEMBLY FOR DRAWING MACHINES, PROVIDED WITH INTERMEDIATE CHAINS, AND METHOD FOR TENSIONING SAID INTERMEDIATE CHAINS

FIELD OF THE INVENTION

The present invention concerns a drawing assembly for drawing machines for metal products such as solid or tubular metal bars. In particular, the drawing assembly according to the invention comprises at least two tracks, opposite and counter-rotating, cooperating from opposite sides with the metal products in order to draw them through the draw plate of a drawing machine.

In particular, the present invention concerns a drawing assembly comprising intermediate chains located between the tracks and corresponding support plates, wherein there is also a tensioning device, to continuously and automatically tension said intermediate chains.

The present invention also concerns the method for tensioning the intermediate chains.

BACKGROUND OF THE INVENTION

Drawing machines are known, for metal products such as solid or tubular bars, which comprise a drawing assembly provided with two tracks, counter-rotating and opposite each other with respect to a drawing axis.

Each track includes a plurality of meshes constrained to each other in sequence, on each of which a drawing clamp is mounted which, during use, presses on at least one bar subjected to drawing.

In particular, each drawing clamp of one track cooperates with a corresponding drawing clamp present on the opposite track, in order to clamp the bar subjected to drawing from opposite sides, on a segment thereof which has already been drawn.

Each track is closed in a ring around a support plate and is made to rotate continuously by toothed wheels, generally two, one drive wheel and one driven wheel, mounted on opposite ends of the same support plate.

It is known to interpose an intermediate chain, of the type with rollers, between the support plate and the corresponding track, with the function of reducing friction between the meshes of the track and the support plate, introducing a rolling friction between these two components.

It is known that intermediate chains are normally idle and receive their motion from the tracks due to the effect of the contact with the meshes of the tracks. Generally, intermediate chains consist of meshes connected to each other with a desired play that allows to prevent the movement of the intermediate chains from blocking.

It is also known that intermediate chains are subjected during use to considerable wear, and to elongation due to the mechanical dilation of the various plays between the meshes that make up the chains.

As time goes on, this elongation becomes considerable, and can compromise the correct functioning of the intermediate chains, and also of the tracks in their entirety; it is therefore necessary to intervene to restore initial conditions.

To do this, it is necessary to cancel in the intermediate chains the effect of the mechanical dilation on the entity of overall play, by tensioning the intermediate chains themselves.

One disadvantage of known drawing assemblies is that they provide that the tensioning of the intermediate chains is carried out manually by a suitable operator; this means that the drawing machine must be stopped, and the operation in any case is imprecise and not effective.

Another disadvantage of known drawing assemblies is that identifying a condition of excessive elongation is based exclusively on the experience of the operator; it may therefore not be made at the best time, for example too early or too late. This second situation can determine a risk for the mechanical integrity of the intermediate chains, and also of the whole drawing assembly.

One purpose of the present invention is to obtain a drawing assembly for drawing machines in which the intermediate chains between the counter-rotating tracks and the support plates are automatically tensioned during functioning.

Another purpose of the present invention is to obtain a drawing assembly for drawing machines which allows to maintain a constant tensioning of the intermediate chains by means of continuous tensioning during functioning.

Another purpose of the present invention is to perfect a method for automatically and continuously tensioning the intermediate chains.

Another purpose of the present invention is to obtain a drawing assembly for drawing machines in which the condition of excessive elongation of the intermediate chains is identified and possibly signaled automatically, repeatably and effectively.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a drawing assembly according to the present invention can be used in drawing machines for metal products and comprises two tracks, opposite each other and counter-rotating, that collaborate with the metal products on opposite sides with respect to a drawing axis in order to draw them along the drawing axis. The tracks, moreover, are disposed in a closed ring around respective support plates, and an intermediate chain is provided for each track, interposed between the track and the corresponding support plate.

According to a characteristic feature of the present invention, each support plate includes a central support portion and at least two guide segments, curved and positioned in a direction parallel to the drawing axis, on opposite sides of the central support portion, having a convex shape externally mating with the curve of the intermediate chain.

The drawing assembly comprises, for each intermediate chain, an automatic tensioning device provided with at least one thruster member acting on a respective one of the guide segments in order to exert constantly upon it a distancing thrust from the central support portion, to keep the guide segment constantly in contact with the corresponding intermediate chain.

One advantage of the present invention is therefore that it allows a constant tensioning of the intermediate chains over time, and does not require any intervention by operators.

In fact, the tensioning is guaranteed continuously by the thrust of the thruster members on the corresponding guide segments, which are therefore kept in contact with the intermediate chains during the functioning of the drawing assembly even during the curved segment of the movement of the meshes of the intermediate chains themselves, and are able to compensate for elongations and deformations of the latter. Therefore, the intermediate chains are always correctly tensioned.

Another advantage of the present invention is that each intermediate chain is constantly guided along its whole development, even in the curved segments as we said, which guarantees less wear and therefore greater reliability of the drawing assembly.

In one solution of the invention, each of the guide segments has a first end pivoted to the central support portion and a second end opposite the first end.

In this solution, one form of embodiment provides that the thruster member acts on the second end of the guide segment, to allow the guide segment to rotate with respect to the first end, which is fixed.

In some forms of embodiment of the present invention, the thruster members each comprise a containing body inside which a mobile element is slidingly inserted, having a head end located constantly in contact with the second end of a corresponding guide segment, and a tail end subjected to a thrust pressure.

According to variants of the present invention, all the mobile elements are subjected to the same thrust pressure, or different thrust pressures are provided for mobile elements located on different sides of the central support portion.

In this way it is possible to control, and possibly differentiate, the tensioning action of the thruster members on the intermediate chains depending on specific requirements and/or operating conditions.

In some forms of embodiment of the present invention, for each intermediate chain, the drawing assembly comprises a pair of thrust segments on each of the two opposite sides of the central support portion. The thrust segments both have a shape externally convex in a manner mating with the curve of the intermediate chain, and each comprise a pivoting part connected to the central support portion, and a connection part, opposite the pivoting part and mobile with respect to the central support portion. The thrust segments are reciprocally hinged in correspondence with the connection parts, to define an articulated coupling.

This solution offers the advantage of allowing an optimum and complete guide of the intermediate chains even in the curved zones thereof, so as to guarantee minimized wear of the intermediate chains and, consequently, to improve efficiency, duration and productivity of the drawing machines comprising a drawing assembly according to the present invention.

The present invention also concerns a method for tensioning intermediate chains of drawing assemblies for drawing machines for metal products, in which the intermediate chains are interposed between a corresponding track and a corresponding support plate which provides to constantly exert a thrust on guide segments with which the support plate is provided, in order to progressively distance at least one part of the guide segments from a central portion of the support plate, and to maintain the guide segments, by means of said thrust, constantly in contact with the corresponding intermediate chain.

According to some features of the present invention, the tensioning method also provides to continuously monitor the position of the guide segments, comparing it with a pre-set threshold value, corresponding to a maximum admissible value of elongation of each intermediate chain, to automatically detect when the threshold value is reached, and to signal this fact, for example acoustically and/or visually, and possibly to stop the functioning of the corresponding drawing machine.

BRIEF DESCRIPTION OF THE DRAWINGS

These and other characteristics of the present invention will become apparent from the following description of some forms of embodiment, given as a non-restrictive example with reference to the attached drawings wherein:

FIGS. 4 and 5 are variants of FIG. 2 and FIG. 3 respectively.

Figure 1:
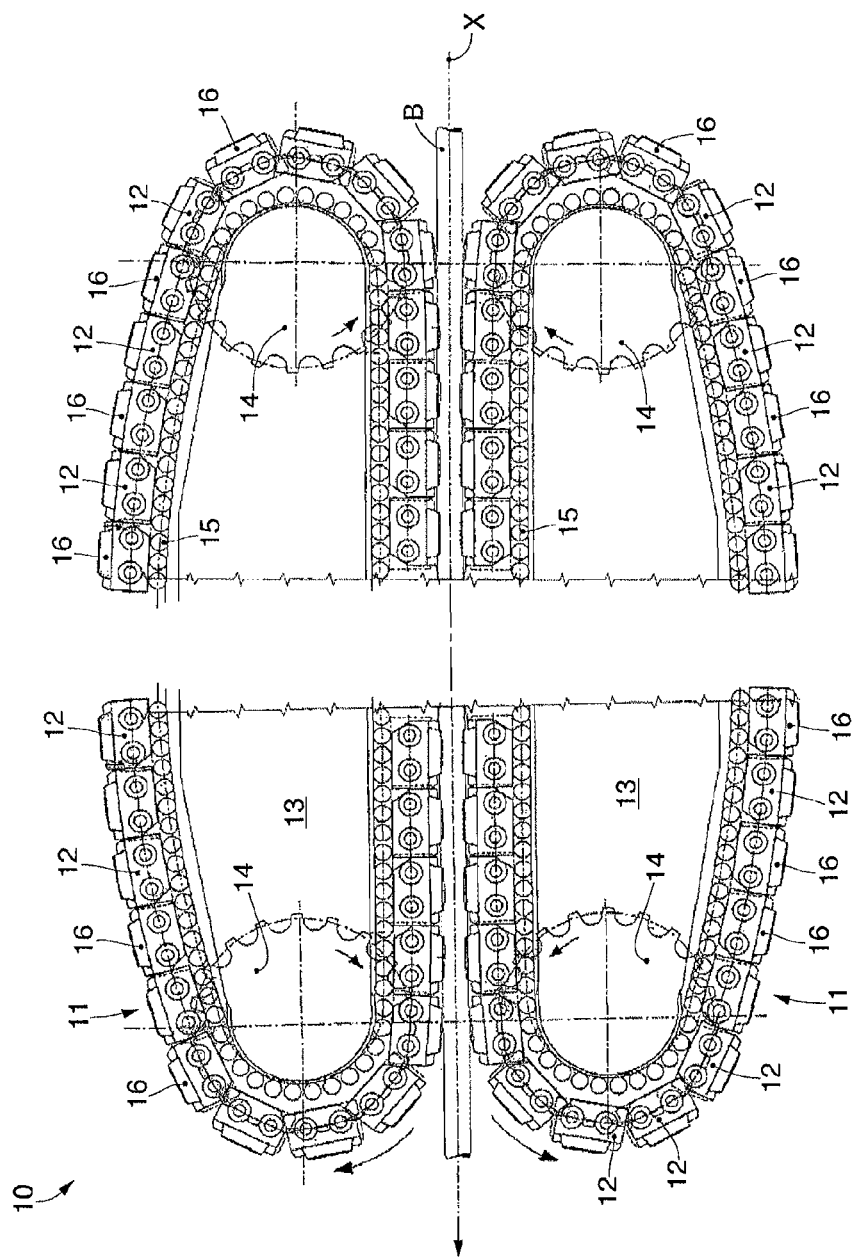
FIG. 1 is a lateral view of a drawing assembly according to the present invention.

In the following description, the same reference numbers indicate identical parts of the drawing assembly according to the present invention, also in different forms of embodiment. It is understood that elements and characteristics of one form of embodiment can be conveniently incorporated into other forms of embodiment without further clarifications.

DETAILED DESCRIPTION OF SOME FORMS OF EMBODIMENT

We shall now refer in detail to the various forms of embodiment of the invention, of which one or more examples are shown in the attached drawings. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

FIG. 1 is used to describe forms of embodiment of a drawing assembly 10 according to the present invention, which can be installed in a drawing machine for metal products, such as for example bars B.

The drawing machine is known, and is not therefore shown in the attached drawings.

The drawing assembly 10 can be configured to draw a bar B to be drawn along a drawing axis X.

In some forms of embodiment, the drawing assembly 10 can include a pair of tracks 11, reciprocally counter-rotating and disposed symmetrical and opposite each other with respect to the drawing axis X, for example above and below it.

Each track 11 can include a plurality of meshes 12, constrained to each other by means of suitable articulations, and a corresponding drawing clamp 16 can be mounted on each of them, in a selectively removable manner.

The two tracks 11, in a known manner, can be mounted on respective support plates 13, and made to rotate continuously by toothed wheels 14 cooperating with the meshes 12.

The drawing assembly 10 can include for each track 11 an intermediate chain 15, for example of the roller type, interposed between the track 11 and the corresponding support plate 13, to function as a mean to reduce the friction between the two components.

Each intermediate chain 15 introduces rolling friction between the track 11 and the support plate 13, preventing sliding friction from occurring between them, which would limit the efficiency of the whole drawing assembly 10 and obstruct the relative motion between track 11 and support plate 13.

The rotation conferred on the tracks 11 by the toothed wheels 14 can be intended to bring the bar B into contact with pairs of opposite drawing clamps 16, belonging to the two tracks 11, in order to exert a pressure action on the bar B and impart thereto a desired drawing traction along the drawing axis X.

Figure 2:
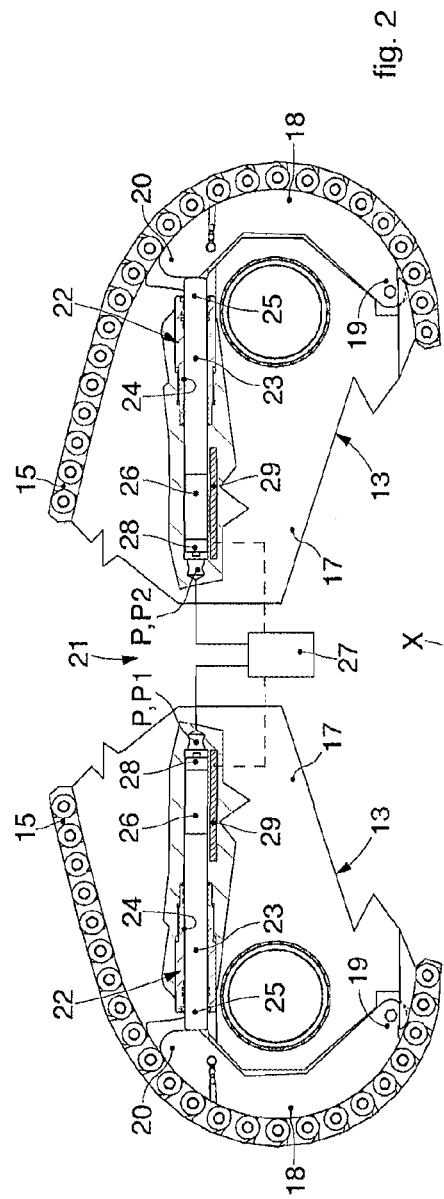
FIGS. 2 and 3 are partial lateral views of the drawing assembly in FIG. 1, in two different operating conditions.
Figure 3:
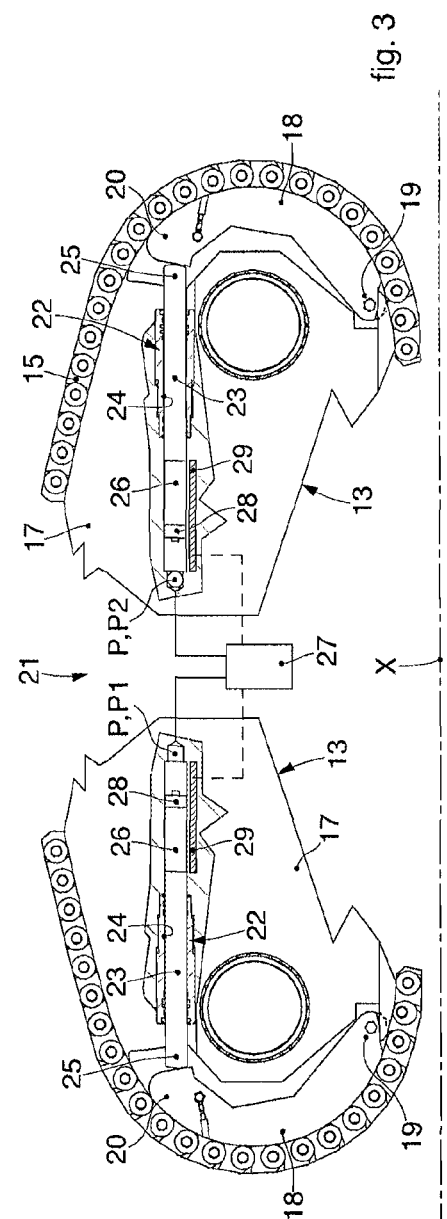

FIGS. 2 and 3 are used to describe forms of embodiment of the drawing assembly 10 in which each support plate 13 includes a central support portion 17 and two lateral appendixes 18, positioned on opposite sides of the central support portion 17 in a direction parallel to the drawing axis X.

For the purposes of simplification and clarity of exposition, FIGS. 2 and 3 show only the upper track 11, but this is not intended to limit the validity of the following description. Indeed, the following description and considerations referring to the upper track 11 are valid also for the lower track 11.

The lateral appendixes 18 can be shaped externally convex, to reproduce the curve of the corresponding intermediate chain 15 and act as guide segments for it.

The lateral appendixes 18 can each include a first end, or pivoting end 19, in correspondence with which each lateral appendix 18 is pivoted to the central support portion 17 of the support plate 13.

In some forms of embodiment, it may be provided that each lateral appendix 18 includes a second end, or free end 20, opposite the pivoting end 19 and mobile with respect to the central support portion 17.

According to possible solutions, for each intermediate chain 15, the drawing assembly 10 can include an automatic tensioning device 21, associated with the corresponding support plate 13.

Each automatic tensioning device 21 can include one or more thruster members, for example linear actuators, such as hydraulic cylinders 22.

Each hydraulic cylinder 22 is configured to act on a free end 20 of the corresponding lateral appendix 18, to exert constantly thereon a thrust toward the outside, that is, away from the central support portion 17 of the support plate 13.

In some forms of embodiment, described by way of example with reference to FIGS. 2 and 3, for each intermediate chain 15 the automatic tensioning device 21 includes two hydraulic cylinders 22.

Each hydraulic cylinder can include a mobile element or plunger 23, sliding in a containing body or jacket 24, which can be made for example in the central support portion 17 of the support plate 13 or can be attached thereto.

Each plunger 23 can include a head end 25 and a tail end 26, opposite each other along the development of the plunger.

The head end 25 is kept constantly in contact with the free end 20 of the lateral appendix 18 during use.

To do this, a desired thrust pressure is maintained in the jacket 24, which acts on the tail end 26 of the plunger 23.

In some forms of embodiment, the same thrust pressure P acts on all the tail ends 26 of the plungers 23.

In other forms of embodiment, a first thrust pressure P1 can act on the plungers 23 of the hydraulic cylinders 22 acting on the lateral appendixes 18 of one side of the support plate 13, in this case on the left in FIGS. 2 and 3, whereas a second thrust pressure P2, different from the first thrust pressure P1, can act on the plungers 23 of the hydraulic cylinders 22 acting on the lateral appendixes 18 of the opposite side of the support plate 13, for example on the right in FIGS. 2 and 3.

In possible implementations of the present invention, two separate hydraulic circuits can be provided, one at the first thrust pressure P1, and one at the second thrust pressure P2.

In variant solutions, which can be combined with all the forms of embodiment described here, the drawing assembly 10 can include a control unit 27, configured to control, manage and maintain the desired thrust pressure P, P1, P2 in the respective circuits.

With reference to FIG. 2, a drawing assembly 10 is shown in an initial operating or reference condition, in which the intermediate chain 15 is tensioned with the plunger 23 retracted to the maximum in the jacket 24.

The constant application of thrust on the free ends 20 of the lateral appendixes 18 determines a rotation thereof around the pivoting ends 19; as a consequence of this rotation, the free ends 20 are distanced from the central support portion 17.

FIG. 3 shows the drawing assembly 10 in an intermediate operating condition, that is, after an intermediate time of use thereof, between the initial operating condition and the condition in which the elongation of the intermediate chain 15 is excessive.

Thanks to said rotation, the lateral appendixes 18 can remain in constant contact with the intermediate chains 15 even when, following use, the latter are subjected to progressive elongation due to the effect of mechanical deformations or the increase in play between the meshes.

Furthermore, the thrust pressures P1 and P2 can be set at values such that the plungers 23 allow the lateral appendixes 18 to follow and compensate the deformations of the intermediate chains 15, and also to carry out the tensioning of the intermediate chains 15, continuously and automatically.

In possible implementations, the control unit 27 can manage the values of the thrust pressures P1, P2 so that the hydraulic cylinders 22 contribute to the dimensional compensation and the tensioning of the intermediate chains 15 in pairs, in succession.

For example, it is possible to set values of the thrust pressure P1 lower than the thrust pressure P2, so that the automatic tensioning device 21 tensions the chains first on one side, that is, by means of a single lateral appendix 18 for each track 11, and then on the other side, that is, making the other lateral appendix 18 intervene as well.

In some forms of embodiment, which can be combined with all the forms of embodiment described here, the automatic tensioning device 21 can include, associated with the tail end 26 of each plunger 13, a signaler 28 to signal the position of the plunger 23, for example of the magnetic, electric or electromagnetic type, or radio waves, infrared, or other type.

The automatic tensioning device 21 can also include a detector 29, coordinated with the signaler 28.

The detector 29 can be associated with the jacket 24 of the hydraulic cylinder 22, or the support plate 13.

The detector 29 can be configured to detect the position of the signaler 28 and to send, to the control unit 27, electric, electronic, radio or other signals relating to said detection.

The control unit 27 can be configured to process the signals and identify the position of the plunger 23, and hence to monitor its travel constantly, and consequently the position of the respective lateral appendix 18.

The control unit 27 can also be configured to identify a travel value of the plunger 23, equal to a preset threshold value, and to signal that said threshold value has been reached, for example visually and/or acoustically, or by interrupting the functioning of the drawing assembly 10.

The threshold value concerns a maximum admissible value of elongation of the intermediate chain 15 before it is necessary to carry out restoration maintenance.

Based on the above, it is therefore possible to keep the intermediate chains 15 constantly and automatically tensioned, and also to identify and signal, automatically, repeatably and reliably, that the maximum admissible value of elongation has been reached.

In variant forms, described by way of example with reference to FIGS. 4 and 5, each support plate 13 can include two pairs of guide segments, respectively a first guide segment 118 and a second guide segment 218, positioned on opposite sides of the central support portion 17.

The first guide segment 118 is identical to the lateral appendix 18 described above and can be provided with a first end, or pivoting end 118a, in correspondence with which it is pivoted to the central support portion 17 of the support plate 13.

The first guide segment 118 can also include a second end or connection end 118b, unconstrained and mobile with respect to the central support portion 17.

One of the hydraulic cylinders 22 presses on the connection end 118b of each first guide segment 118, by means of thrust contact of the respective plunger 23 with the corresponding connection end 118b.

The second guide segment 218 can in turn have a terminal connection portion 218a hinged to the connection end 118b of the first guide segment 118, to define an articulated coupling between the first guide segment 118 and the second guide segment 218.

A pin 30 can be provided to connect the connection end 118b and the terminal connection portion 218a.

The pin 30, in contact with both the first guide segment 118 and also with the second guide segment 218, draws the latter toward the outside, away from the central support portion 17, when the first guide segment 118 is made to rotate around its pivoting end 118a due to the effect of the thrust exerted by the plunger 23 on the connection end 118b.

The second guide segment 218 can include, on the opposite side with respect to the terminal connection portion 218a, a tail terminal portion 218b, which defines a pivoting part of the second guide segment 218 to the central support portion 17.

The tail terminal portion 218b can be closed or, as shown by way of example in FIGS. 4 and 5, open, for example forked.

The tail terminal portion 218b can have a through seating 31, which can be defined for example by a cavity or an eyelet, rectilinear or curved.

The support plate 13 can include a peg 32, positioned in correspondence with the tail terminal portion 218b of the second guide segment 218 and inserted in the through seating 31 to guide the movement of the tail terminal portion 218b.

In particular, the tail terminal portion 218b is rotatable and sliding with respect to the central support portion 17.

In possible solutions, it can be provided that the tail terminal portion 218b is rotatable around, and slidable on, the peg 32 when the second guide segment 218 is moved by drawing by the first guide segment 118.

In the forms of embodiment described with reference to FIGS. 4 and 5, a progressive and persistent intervention by the automatic tensioning device 21 corresponds to a progressive elongation of the intermediate chain 15. By means of the plunger 23, the automatic tensioning device 21 thrusts the first guide segment 118 and the second guide segment 218, forcing them into contact with the intermediate chain 15.

The correct positioning of the guide segments 118, 218 in every operating condition of the drawing assembly 10 is guaranteed by the relative rotation of the guide segments 118, 218 in correspondence with the hinging between the respective connection end 118b and terminal connection portion 218a.

Also in the forms of embodiment just described it is possible to provide signalers 28, detectors 29 and control unit 27 as described above.

It is clear that modifications and/or additions of parts may be made to the drawing assembly 10 as described heretofore, without departing from the field and scope of the present invention.

It is also clear that, although the present invention has been described with reference to some specific examples, a person of skill in the art shall certainly be able to achieve many other equivalent forms of drawing assembly, having the characteristics as set forth in the claims and hence all coming within the field of protection defined thereby.

The invention claimed is:

1. A drawing assembly for drawing machines for metal products comprising two tracks opposite each other and counter-rotating that collaborate with said metal products on opposite sides with respect to a drawing axis to draw the metal products along said drawing axis, said tracks being disposed in a closed ring around respective support plates, and an intermediate chain being provided for each track, interposed between the track and the corresponding support plate, wherein each support plate includes a central support portion and at least two guide segments, curved and positioned in a direction parallel to the drawing axis, on opposite sides of said central support portion, having a convex shape externally mating with the curve of said intermediate chain, said drawing assembly comprising, for each intermediate chain, an automatic tensioning device provided with at least one thruster member acting on a respective one of said guide segments in order to exert constantly upon the guide segment a distancing thrust from said central support portion, to keep said guide segment constantly in contact with the corresponding intermediate chain, wherein each of said guide segments has a first end pivoted to said central support portion and a second end opposite said first end, wherein said thruster member acts on the second end of the corresponding guide segment, to make said guide segment rotate with respect to said first end.

2. The drawing assembly as in claim 1, wherein each thruster member comprises a mobile element having a head end located constantly in contact with said second end of a corresponding guide segment, and a tail end subjected to a thrust pressure.

3. The drawing assembly as in claim 2, comprising a plurality of thruster members and wherein the same thrust pressure acts on all the tail ends of the mobile elements of said thruster members.

4. The drawing assembly as in claim 2, comprising a plurality of thruster members and wherein a first thrust pressure acts on the tail ends of the mobile elements of thruster members of one of said opposite sides of said central support portion, and a second thrust pressure, different from said first thrust pressure, acts on the tail ends of the mobile elements of the thruster members of the other of said opposite sides of said central support portion.

5. The drawing assembly as in claim 2, wherein said automatic tensioning device comprises a signaler to signal the position of said mobile element, associated with said tail end of each mobile element and solidly mobile therewith, and a detector, coordinated with said signaler and configured to continuously detect the position of said detector during the motion of said mobile element.

6. The drawing assembly as in claim 1, wherein each intermediate chain comprises a pair of thrust segments on each of said two opposite sides of said central support portion, said thrust segments both having a shape externally convex in a manner mating with the curve of said intermediate chain, and each comprising a pivoting part connected to said central support portion and a connection part, opposite said pivoting part and mobile with respect to said central support portion, said thrust segments being reciprocally hinged in correspondence with said connection part to define an articulated coupling.

7. The drawing assembly as in claim 6, wherein said thrust segments comprise a first thrust segment and a second thrust segment, wherein the pivoting part of said second thrust segment is configured rotatable and slidable with respect to said central support portion.

8. A method for tensioning said intermediate chains of the drawing assembly of claim 1, comprising constantly exerting a thrust on said second end of said guide segments to progressively distance said guide segments from said support plate, and to maintain the guide segments, by means of said thrust, constantly in contact with the corresponding intermediate chain.

9. The method as in claim 8, further comprising continuously monitoring the position of said guide segments, comparing the positions with a pre-set threshold value, corresponding to a maximum admissible value of elongation of each intermediate chain; and when said threshold value is reached generating a signal that said maximum admissible value of elongation has been reached.

* * * * *